April 2, 1974  R. I. BENNER  3,801,497
PROCESS FOR THE PRODUCTION OF TRACTION FLUID
Filed June 16, 1972
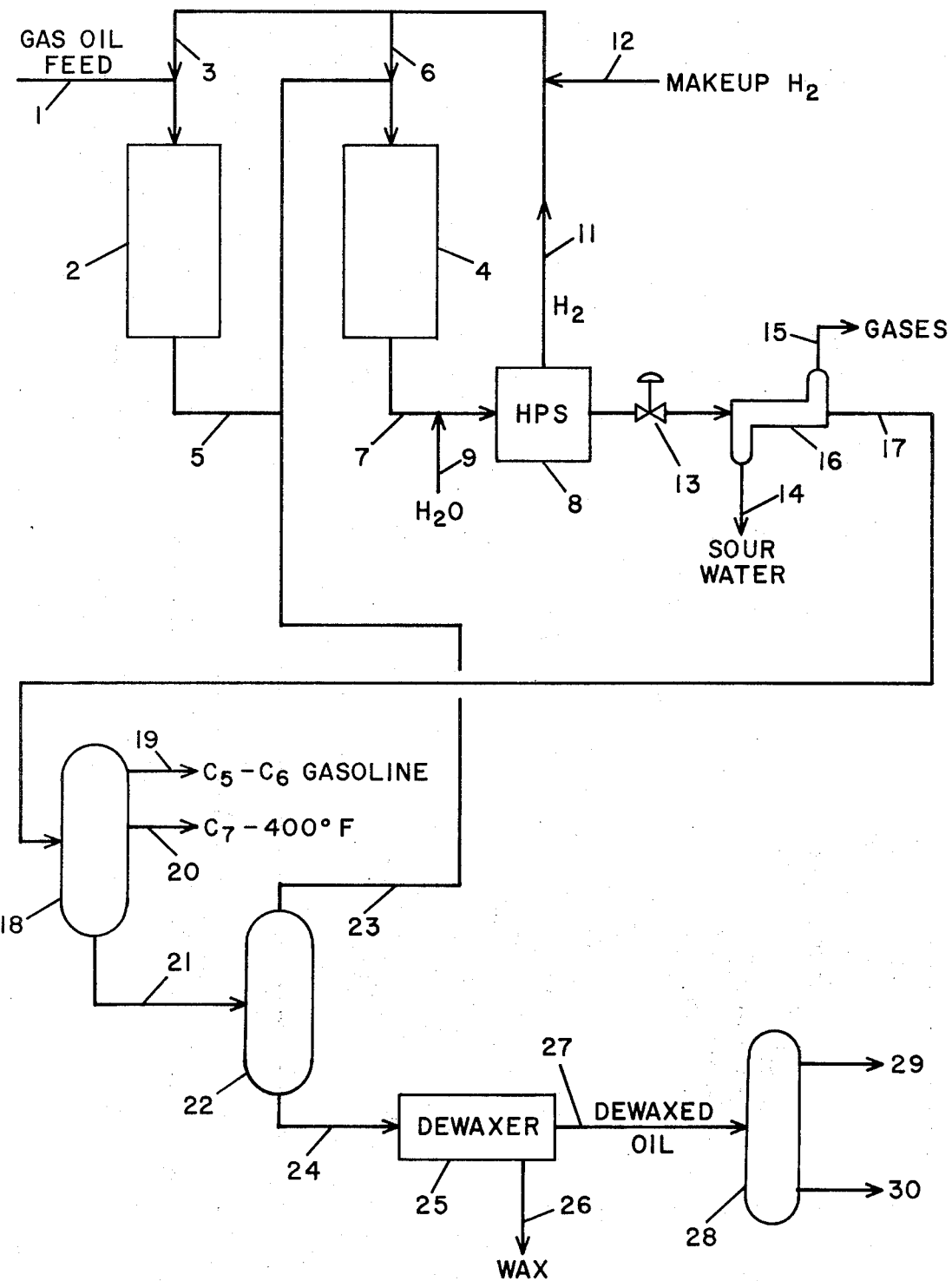

United States Patent Office 3,801,497
Patented Apr. 2, 1974

3,801,497
PROCESS FOR THE PRODUCTION OF TRACTION FLUID
Robert I. Benner, Upper Chichester, Pa., assignor to Sun Oil Company of Pennsylvania, Philadelphia, Pa.
Filed June 16, 1972, Ser. No. 263,495
Int. Cl. C01b 33/28; C10g 13/02, 37/10
U.S. Cl. 208—111
5 Claims

ABSTRACT OF THE DISCLOSURE

A light lube suitable for use as a traction fluid is prepared from a gas oil by hydrocracking. The process involves treating the gas oil over a catalyst such as supported nickel-molybdenum, at from 680 to 780° F. and 800 to 2000 p.s.i.g. in the presence of hydrogen to convert the sulfur present to hydrogen sulfide and the nitrogen present to ammonia. The gas oil is then hydrocracked using magnesium zeolite Y containing 0.2 to 2.0 weight percent of a noble metal at from 680 to 780° F. and from 800 to 2000 p.s.i.g. The resulting hydrocrackate is water washed to remove the hydrogen sulfide and ammonia. The portion of the hydrocracking boiling below 650–750° F. is recycled to the hydrocracker. The higher boiling portion of the hydrocrackate is dewaxed to produce the hydrocracked lube product, useful as a traction fluid.

BACKGROUND OF THE INVENTION

In the past various hydrocracking techniques have been used to produce various lubes and particularly engine oils. Generally these have involved the use of sulfactive catalysts such as supported Ni-Mo and very high pressures. Generally these lubes are characterized by having high V.I. and good lubricity.

Various power transmissions have been developed which depend on rolling friction to transmit torque but which require lubrication. The lubricants for these transmissions require a traction fluid or lubricant which exhibits a high coefficient of traction. As in the case of engine oils it is desirable for traction fluids to have as high a V.I. as possible but not at any significant expense to the coefficient of traction of the fluid.

Various alkaline earth metal zeolite catalysts have been used to produce gasoline components from gas oils where the gas oil is recycled to extinction.

SUMMARY OF THE INVENTION

It has now been found that gas oils can be hydrocracked to produce lubes having fairly high coefficients of traction and relatively high viscosity indices. These hydrocracked lubes can be blended with chemically derived traction fluids to improve the V.I. thereof with little reduction in the coefficient of traction and significant reduction in the cost of the overall traction fluid. This result is achieved through the use of certain alkaline earth metal zeolite catalysts.

DESCRIPTION OF THE DRAWING

The drawing is an overall flowsheet of the process of the present invention.

A feed stream 1 of a gas oil boiling for instance in the range of from 400 to 900° F. is fed to a pretreat reactor 2. Hydrogen is recycled through pretreat reactor 2 by means of recycle line 3. The pretreated gas oil is fed to hydrocracker 4 by means of line 5. Hydrogen is recycled through hydrocracker 4 by means of recycle line 6. Hydrocrackate is removed from hydrocracker 4 by means of line 7 and fed to high pressure separator 8. Water is injected into line 7 by means of line 9 to dissolve the hydrogen sulfide and ammonia formed in the pretreater. $H_2$ is separated from the effluent in vessel 8 by line 11, and recycled to vessels 2 and 4 by lines 3 and 6. Makeup $H_2$ is supplied by line 12. The pressure is reduced by control valve 13. Sour water is stream 14 and gases as stream 15 are removed in vessel 16. Hydrocarbons as stream 17 are fractionated in distillation column 18. $C_5$–$C_6$ hydrocarbons in line 19 are used directly as a gasoline blending component, $C_7$–400° F. hydrocarbons in line 20 are used as a reformer charge stock for gasoline blending. The bottoms from distillation column 18 are fed by means of line 21 to vacuum distillation column 22 where the gas oil boiling below the lube oil range and above the gasoline range such as 400–700° F. is removed and recycled to hydrocracker 4 by means of line 23. The lube fraction is removed from column 22 by means of line 24 and fed to dewaxer 25. In dewaxer 25 wax is removed as stream 26 and the dewaxed oil is fed by means of line 27 to vacuum distillation column 28 where the oil is fractionated into streams 29 and 30.

DESCRIPTION OF THE INVENTION

The present invention provides a process for producing high quality light lube oils from gas oil feedstocks. These lubes find a special use as extenders for chemically derived traction fluids because of their high coefficients of traction of above 0.075 coupled with a high VTF-viscosity index of above 85 and for certain fractions above 95.

Generally suitable feedstocks for use in the present invention boil in the range of from 350–450° F. up to 850–925° F. Generally the feedstock will contain from 65 to 80 wt. percent saturates. The preferred hydrocracking catalysts comprise crystalline, siliceous zeolites, sometimes referred to in the art as molecular sieves, which contain silica, alumina and one or more exchangeable cations such as hydrogen, magnesium or rare earth metals. These zeolites are further characterized by having crystal pores of relatively uniform diameter between about 4 and 14 angstroms. Suitable zeolites include for example molecular sieves A, L, S, T, X and Y and natural zeolites such as chabazite, mordenite, etc. It is preferred to employ zeolite Y. The naturally occurring molecular sieves are usually found in a sodium form, or an alkaline earth form or mixed forms. The synthetic molecular sieves normally are prepared first in the sodium form. In any case for use herein it is preferred that most or all of the original monovalent metals be ion exchanged out with a polyvalent metal. The preferred polyvalent metal for this purpose is magnesium. Following this the zeolite is impregnated with from 0.2 to 2.0 wt. percent of a noble metal, of which palladium is preferred. The noble metal may either be simply impregnated on the zeolite or ion exchanged onto the zeolite followed by a hydrogen treatment at elevated temperature to reduce the noble metal to the free metal state. After ion exchange and impregnation, etc. the catalyst should be calcined in an oxygen-containing atmosphere such as air or oxygen for a moderate period such as an hour at a temperature of from 700 to 1200° F. The catalyst may be used in undiluted form, or the powdered catalyst may be mixed and copelletized with diluents such as alumina, silica gel, coprecipitated silica gel, etc. The preferred catalyst is zeolite Y which has been ion exchanged with magnesium and then ion exchanged with palladium.

These catalysts are poisoned by both sulfur and nitrogen. Therefore if the gas oil contains more than about 10 p.p.m. of nitrogen or more than about 200 p.p.m. of sulfur it is desirable to pretreat the gas oil prior to hydrocracking in order to increase the life of the hydrocracking catalyst. The pretreat step serves to convert the sulfur present into hydrogen sulfide and the nitrogen present into ammonia. Neither the hydrogen sulfide nor ammonia in moderate amounts have a deleterious effect on the hydrocracking catalyst. Generally the catalyst used in the pretreat reactor is from 0.5 to 10% by weight nickel or cobalt and from 0.5 to 10% by weight molybdenum or tungsten supported on silica or silica alumina. The preferred catalyst is nickel-molybdenum. Generally the pretreat reactor is operated at 680 to 780° F., from 800 to 2000 p.s.i.g. with a gas oil feed rate of from 0.5 to 5.0 LHSV and a hydrogen recycle feed rate of from 1000 to 10,000 s.c.f. of hydrogen per barrel of gas oil feed.

After being pretreated the gas oil is fed to the hydrocracker, where the hydrocracking is carried out at from 650° F. to 780° F. and preferably 685° F. to 730° F. in order to optimize the amount of product oil obtained and its quality. Suitable pressures are from 1250 p.s.i.g. to 1750 p.s.i.g. Suitable space rates including the recycled gas oil are from 0.5 to 3.0 LHSV. Generally the hydrogen recycle rate in the hydrocracker is from 3000 to 10,000 s.c.f. of hydrogen per barrel of gas oil feed. By using the catalyst and conditions described above the hydrockrackate from the hydrocracker is found to be very high in saturates as compared with the feed and further only a small amount of the original feed boiling in the lube oil range is cracked to below the lube oil boiling range.

The hydrockrackate is then fractionated to separate the lube oil fraction from the lighter fractions. Generally the cut point between the lube oil and lighter fractions is from 650 to 725° F. The lighter hydrocarbons can be separated into whatever fractions are desired. Generally the four to six carbon atom hydrocarbons can be blended directly into gasoline while the higher hydrocarbons boiling below 350–450° F. normally should be reformed in the conventional manner to upgrade their octane numbers. The fraction boiling from 350–450° F. up to 650–725° F. is recycled to the hydrocracker.

The lube oil fraction is then dewaxed. Any of the conventional dewaxing techniques may be used. Generally the solvent dewaxing involves dissolving the oil to be dewaxed in a solvent which rejects the wax followed by filtration. Suitable solvents are methyl ethyl ketone and mixtures thereof with benzene and/or toluene. Other solvent systems such as benzene/toluene, liquid sulfur dioxide/benzene or ethylene dichloride/benzene may also be used. Generally a solvent dosage of from 4:1 to 10:1 solvent:oil is used. Generally the solvent-oil mixture is cooled to $-10°$ F. to $+10°$ F. to cause the wax to separate followed by filtration to remove the wax and distillation to remove the solvent.

After dewaxing the oil is generally fractionated into a plurality of cuts depending on the intended use. The oils produced by the present invention and particularly the cut boiling at from 675–725° F. to 740–775° F. finds particular use as a fraction fluid or as a diluent for chemically derived traction fluids. Traction fluids are used as lubricants in engine transmissions which depend on rolling friction for the transmission of power. The requirements of a traction fluid are discussed in the following United States patents:

| Patent No. | Patentee | Issue date |
|---|---|---|
| 2,549,377 | H. R. Kremmerer | Apr. 17, 1951. |
| 3,411,369 | W. C. Hammann et al. | Nov. 19, 1968. |
| 3,440,894 | W. C. Hammann et al. | Apr. 29, 1969. |

Exemplary tractive devices in which the traction fluids of the present invention find use are disclosed in the following United States patents:

| Patent No. | Patentee | Issue Date |
|---|---|---|
| 1,867,553 | A. W. Gardiner et al. | July 19, 1932. |
| 2,871,714 | Z. V. Weisel | Feb. 3, 1959. |
| 3,006,206 | O. K. Kelley et al. | Oct. 31, 1961. |
| 3,184,990 | F. G. de Brie Perry | May 25, 1965. |

Additionally these oils find use as engine oils, electrical oils, etc.

DESCRIPTION OF THE PREFERRED EMBODIMENTS

A blend of 56.6 vol. percent of a fresh gas oil and 45.4 vol. percent of a light vacuum gas oil is charged to a pretreat reactor. The blend has a gravity of 30.5 API, a viscosity of 66 SUS @ 100° F. and 35.5 SUS @ 210° F., contains 86.61% carbon, 13.13% hydrogen, 250 p.p.m. nitrogen and 1600 p.p.m. sulfur. The blend contains 29.4 wt. percent aromatics which have an average molecular weight of 271 and 70.6 wt. percent saturates. The initial boiling point is 400° F., the 5% boiling point is 506° F., the 95% boiling point is 830° F. and the end point is 870° F., with a 98% recovery. The gas oil feedstock is fed to a pretreater operated at 700° F. under a pressure of 1500 p.s.i.g. at a LHSV of 2. The catalyst is sulfided nickel-molybdenum on alumina. Hydrogen gas is recycled through the reactor at a rate of 5000 s.c.f. of hydrogen per barrel of gas oil feed. The pretreated gas oil is then fed to a hydrocracker. The hydrocracker is operated at 695° F. and 1550 p.s.i.g. with a LHSV of 1.3. The catalyst is magnesium zeolite Y containing 0.5% atomically displaced palladium. Hydrogen is continuously fed to the system and recycled at a rate of 9000 s.c.f. per barrel of total feed (including recycle) per hour. Water is mixed with the hydrocracker effluent to remove $H_2S$ and $NH_3$ as ammonium bisulfides in solution. Hydrogen gas is removed from the high pressure separator and fed to the hydrogen recycle stream of the hydrocracker along with whatever fresh makeup hydrogen is required. A $C_4$-$C_6$ side stream is removed from the distillation which is useful directly as a gasoline blending stock. A $C_7$–400° F. side stream is also removed from the distillation column which is useful as a reformer charge stock for ultimate gasoline blending. The remaining hydrockrackate is removed from the bottom of the distillation column and fed to a vacuum distillation column. The vacuum distillation separates the 400–700° F. fraction from the 700+ ° F. fraction.

The 400–700° F. fraction has a total sulfur analysis of 6 p.p.m. and a total nitrogen analysis of 1 p.p.m. and is recycled to the hydrocracker. The 700+ ° F. fraction is solvent dewaxed at 0° F. using a solvent to oil ratio of 6:1. The solvent used is 50 vol. percent methyl ethyl ketone, 17 vol. percent toluene and 33 vol. percent benzene. The solvent dewaxed oil is fractionated into a cut boiling at 704–748° F. and a cut boiling at 748+ ° F. The total 704+ ° F. oil fraction amounts to a 10 vol. percent yield as based on the original gas oil feedstock. The fraction boiling at 704–748° F. has a coefficient of traction of 0.077 and a VTF–VI of 97. The fraction boiling above 748° F. has a coefficient of traction of 0.076 and a VTF–VI of 87. As used herein VTF–VI refers to Viscosity Temperature Function-Viscosity Index as determined by the technique of W. A. Wright as set forth in ASTM Bulletin #215, 84 (1956). The coefficient of traction as used herein is determined with a Roxana 4-ball wear and friction tester using a load of 15 kg. at 1800 r.p.m. A blend of 50 vol. percent of the 704–748° F. cut, and 50 vol percent of $\alpha$-methylstyrene dimer having the indan structure has a coefficient of traction of 0.0814 and a VTF–VI of 58.

By way of comparison alkyldecalins have a coefficient of traction of 0.081 to 0.082 and a VTF–VI of $-54$. Sun 60 N (hydrogenated naphthenic oil) has a coefficient of traction of about 0.077 and VTF-VI of zero or less. Sunvis 6H (hydrogenated paraffinic oil) has a coefficient of traction of 0.071 and a VTF–VI of 89.

The invention claimed is:
1. A process comprising:
    (a) hydrocracking a gas oil feedstock having a boiling range of from 350° F. to 450° F. up to from 850° F. 925° F. using an alkaline earth metal zeolite catalyst at from 650° F. to 725° F., a pressure of from 1250 p.s.i.g. to 1750 p.s.i.g. at a liquid hourly space velocity, including material recycled from step (c) of from about 1.0 to about 3.0 while recycling hydrogen,
(b) fractionating the resulting hydrocrackate into material boiling below 350° F. to 450° F., a fraction boiling in the range of from 350° F. to 450° F. up to 650° F. to 725° F. and a fraction boiling over 650° F. to 725° F.,
(c) recycling the fraction boiling in the range of from 350° F. to 450° F. up to 650° F. to 725° F., and
(d) dewaxing the fraction boiling above 650° F. to 725 F.

2. The process of claim 1 wherein the alkaline earth metal zeolite catalyst is an alkaline earth zeolite Y.

3. The process of claim 2 wherein the gas oil feedstock contains from 65 to 80 wt. percent saturates.

4. The process of claim 3 wherein the catalyst is magnesium zeolite Y.

5. The process of claim 1 wherein the fraction boiling above 650° F. to 725° F. is fractionated to give an end point of from 740° F. to 775° F. which fraction has a coefficient of traction of at least 0.075 and a VTF-VI of at least 95.

References Cited

UNITED STATES PATENTS

| 3,132,087 | 5/1964 | Kelley et al. | 208—60 |
| 3,494,854 | 2/1970 | Gallagher et al. | 208—59 |
| 3,658,689 | 4/1972 | Steinmetz et al. | 208—59 |
| 3,684,684 | 8/1972 | Coleman et al. | 208—28 |
| 3,732,156 | 5/1973 | Bennett et al. | 208—111 |

DELBERT E. GANTZ, Primary Examiner

G. E. SCHMITKONS, Assistant Examiner

U.S. Cl. X.R.

208—DIG. 2, 18, 77, 89